(12) United States Patent
Matsubara

(10) Patent No.: US 9,249,949 B2
(45) Date of Patent: Feb. 2, 2016

(54) LIGHTING DEVICE AND PROJECTION-TYPE DISPLAY DEVICE USING THE SAME INCLUDING A COLOR-COMBINING PRISM

(75) Inventor: Masateru Matsubara, Tokyo (JP)

(73) Assignee: NEC DISPLAY SOLUTIONS, LTD., Tokyo (JP)

(*) Notice: Subject to any disclaimer, the term of this patent is extended or adjusted under 35 U.S.C. 154(b) by 294 days.

(21) Appl. No.: 13/882,976

(22) PCT Filed: Nov. 9, 2010

(86) PCT No.: PCT/JP2010/069926
§ 371 (c)(1),
(2), (4) Date: May 1, 2013

(87) PCT Pub. No.: WO2012/063322
PCT Pub. Date: May 18, 2012

(65) Prior Publication Data
US 2013/0215397 A1    Aug. 22, 2013

(51) Int. Cl.
*G03B 21/20* (2006.01)
*F21V 13/02* (2006.01)
*F21V 13/12* (2006.01)
(Continued)

(52) U.S. Cl.
CPC ............. *F21V 13/02* (2013.01); *F21V 13/12* (2013.01); *F21V 29/02* (2013.01); *G03B 21/16* (2013.01); *G03B 21/204* (2013.01); *G03B 21/2033* (2013.01); *G03B 21/2066* (2013.01); *G03B 21/208* (2013.01); *G03B 21/2013* (2013.01);
(Continued)

(58) Field of Classification Search
CPC ............. G03B 21/204; G03B 21/2033; G03B 21/2066; G03B 21/208; G03B 21/2013; H04N 9/3111; H04N 9/3158; H04N 9/3161; H04N 9/3164
See application file for complete search history.

(56) References Cited

U.S. PATENT DOCUMENTS 7,059,726 B2* 6/2006 Engle .................... G03B 21/28
                                                          348/798
7,070,300 B2* 7/2006 Harbers ............. G02B 27/1046
                                                        257/E33.071
(Continued)

FOREIGN PATENT DOCUMENTS

CN         101052915 A       10/2007
CN         101263420 A        9/2008
(Continued)

OTHER PUBLICATIONS

Japanese Office Action dated Aug. 19, 2014, with a partial English Translation.
(Continued)

*Primary Examiner* — Bao-Luan Le
(74) *Attorney, Agent, or Firm* — McGinn IP Law Group PLLC

(57) ABSTRACT

A lighting device includes: a phosphor wheel; a color-combining prism including dichroic surfaces, the film surfaces of these dichroic surfaces being disposed to cross a center ray of luminous flux of fluorescence emitted from the phosphor wheel and to be orthogonal to a plane that contains the center ray; a blue laser; a red laser; and excitation light sources. When viewed from the direction perpendicular to the plane, the blue laser, red laser, and excitation light sources are arranged on one side of the center ray of the luminous flux of the fluorescence.

17 Claims, 9 Drawing Sheets

(51) Int. Cl.
*F21V 29/02* (2006.01)
*G03B 21/16* (2006.01)
*H04N 9/31* (2006.01)

(52) U.S. Cl.
CPC ............ *H04N 9/3111* (2013.01); *H04N 9/3161* (2013.01); *H04N 9/3164* (2013.01)

(56) References Cited

U.S. PATENT DOCUMENTS

| | | | | |
|---|---|---|---|---|
| 7,167,315 B2* | 1/2007 | Watson | ................ | H04N 9/3105 348/E9.026 |
| 7,234,820 B2* | 6/2007 | Harbers | ............. | G02B 27/0983 348/E9.027 |
| 7,494,228 B2* | 2/2009 | Harbers | ............. | G02B 27/0983 348/339 |
| 7,540,616 B2 | 6/2009 | Conner | | |
| 7,943,893 B2 | 5/2011 | Sawai | | |
| 8,376,551 B2* | 2/2013 | Cobb | ................... | G02B 27/102 353/33 |
| 8,545,032 B2* | 10/2013 | Chen | ...................... | G03B 21/14 362/260 |
| 8,662,678 B2* | 3/2014 | Hirata | .................... | G03B 21/20 353/94 |
| 8,870,384 B2* | 10/2014 | Imai et al. | ........................ | 353/33 |
| 2003/0133080 A1 | 7/2003 | Ogawa et al. | | |
| 2005/0270775 A1* | 12/2005 | Harbers | ............. | G02B 27/1046 362/231 |
| 2006/0227302 A1* | 10/2006 | Harbers | ............. | G02B 27/0983 353/94 |
| 2007/0132962 A1 | 6/2007 | Kitamura | | |
| 2007/0297061 A1* | 12/2007 | Kyomoto | ........... | G02B 27/1053 359/618 |
| 2008/0278693 A1 | 11/2008 | Sawai | | |
| 2009/0161076 A1* | 6/2009 | Chen | ...................... | G03B 21/20 353/31 |
| 2009/0262308 A1 | 10/2009 | Ogawa | | |
| 2011/0199580 A1* | 8/2011 | Hirata | .................... | G03B 21/20 353/31 |
| 2011/0205501 A1* | 8/2011 | Cobb | ................... | G02B 27/102 353/81 |
| 2012/0044279 A1* | 2/2012 | Uchino | .................. | G02B 27/48 345/690 |
| 2012/0170002 A1* | 7/2012 | Ouderkirk | ............ | H04N 9/3164 353/30 |
| 2012/0182525 A1* | 7/2012 | Imai et al. | ........................ | 353/20 |
| 2013/0057833 A1* | 3/2013 | Katou | ...................... | G02B 5/26 353/31 |

FOREIGN PATENT DOCUMENTS

| | | |
|---|---|---|
| CN | 101361022 A | 2/2009 |
| JP | 2003-186110 A | 7/2003 |
| JP | 2005-347263 A | 12/2005 |
| JP | 2006-126644 A | 5/2006 |
| JP | 2008-216923 A | 9/2006 |
| JP | 2007-003914 A | 1/2007 |
| JP | 2007-157638 | 6/2007 |
| JP | 2007-218956 A | 8/2007 |
| JP | 2008-256979 A | 10/2008 |
| JP | 2008-268601 A | 11/2008 |
| JP | 2008-281829 A | 11/2008 |
| JP | 2009-058594 A | 3/2009 |
| JP | 2009-521786 A | 6/2009 |
| JP | 2009-150938 A | 7/2009 |
| JP | 2009-259583 A | 11/2009 |
| JP | 2010-169754 A | 8/2010 |
| JP | 2010-197497 A | 9/2010 |
| JP | 2010-198805 A | 9/2010 |
| JP | 2010-231063 A | 10/2010 |

OTHER PUBLICATIONS

Chinese Office Action dated Sep. 22, 2014, with English Translation thereof.
International Search Report in PCT/JP2010/069926 dated Dec. 14, 2010 (English Translation Thereof).
Japanese Office Action dated May 27, 2014 w/a partial English Translation.
Japanese Office Action dated Apr. 28, 2015 with a partial English translation.

* cited by examiner

LIGHTING DEVICE AND PROJECTION-TYPE DISPLAY DEVICE USING THE SAME INCLUDING A COLOR-COMBINING PRISM

TECHNICAL FIELD

The present invention relates to the lighting device of a projection-type display device.

BACKGROUND ART

Patent Document 1 describes a projector that uses a phosphor as a light source.

The principle parts of the projector described in Patent Document 1 are made up by a light source device, a cooling fan, a display element, and projection-side optics.

The light source device includes a light-emitting device in which the fluorescent color is red, a light-emitting device in which the fluorescent color is green, a light-emitting device in which the fluorescent color is blue, and first and second dichroic mirrors that combine the fluorescent light of each color from these light-emitting devices.

Each light-emitting device includes a cylinder-shaped rotating body in which a phosphor layer is formed on the outer periphery, a drive source that rotates the rotating body, a collimator lens that converts the fluorescent luminous flux emitted from the phosphor layer to parallel luminous flux, an excitation light source, and a mirror that reflects excitation light from the excitation light source in the direction toward the phosphor layer. The excitation light that is reflected by the mirror is irradiated by way of the collimator lens onto the phosphor layer. The fluorescent light that is emitted from the phosphor layer is converted to parallel luminous flux by the collimator lens.

The blue fluorescent light that is emitted from the blue light-emitting device is entered to one surface of the first dichroic mirror and the green fluorescent light that is emitted from the green light-emitting device is entered to the other surface of the first dichroic mirror. The first dichroic mirror has the property of transmitting blue light but reflecting green light and thus combines the incident blue and green fluorescent light.

The fluorescent light (green and blue) that is combined in the first dichroic mirror is entered to one surface of the second dichroic mirror, and red fluorescent light that is emitted from the red light-emitting device is entered to the other surface of the second dichroic mirror. The second dichroic mirror has the property of transmitting blue and green light but reflecting red light and thus combines the incident blue, green, and red fluorescent light.

Each light-emitting device is arranged in a chamber that is supplied with an air current from a cooling fan. Each light-emitting device is cooled by supplying the air current from the cooling fan to each light-emitting device.

In the above-described projector, light from the light source device is irradiated to a display element, and the image formed in this display element is then projected onto a screen by projection-side optics.

In addition to the above-described projector, Patent Document 2 describes a projector that uses light-emitting diodes (LED) as a light source.

The projector described in Patent Document 2 has illumination optics that includes: a red LED array in which a plurality of red LEDs are arranged, a green LED array in which a plurality of green LEDs are arranged, a blue LED array in which a plurality of blue LEDs are arranged, and a cross dichroic prism that combines the luminous flux for each of the colors red, green, and blue from these LED arrays.

In the above-described projector, light from the illumination optics is irradiated into a digital micro-device (DMD) and the image formed by the DMD is projected onto a screen by projection lenses.

LITERATURE OF THE PRIOR ART

Patent Documents

Patent Document 1: Japanese Unexamined Patent Application Publication No. 2010-197497

Patent Document 2: Japanese Unexamined Patent Application Publication No. 2003-186110

SUMMARY OF THE INVENTION

The recent advances in the development of compact high-luminance projectors have created demand for lighting devices (the light source device described in Patent Document 1 and the illumination optics described in Patent Document 2) that are more compact and that have greater luminance so that such projectors can be realized.

Because the light sources such as LEDs or excitation light sources (for example, semiconductor lasers) that make up the lighting device give off a large volume of heat, cooling means for cooling these light sources is normally provided inside the projector to limit the effect of heat upon other components. Depending on the configuration of the lighting device (in particular, the arrangement of each light source), the cooling means may become a large-scale structure, resulting in an increase in the size of the projector. As a result, the lighting device must be configured to avoid an increase in the size of the cooling means.

In the projector described in Patent Document 1, the light-emitting device of each color can be cooled by one cooling fan, whereby the increase in the size of the cooling means can be limited. However, in the projector described in Patent Document 1, the light-emitting device employs a phosphor, and the device is therefore larger than a solid-state light source such as a semiconductor laser or LED, and miniaturization of the light source device becomes problematic.

On the other hand, in the projector described in Patent Document 2, since LEDs are used as the light source, it is easier to realize illumination optics (lighting device) having greater compactness compared to the device described in Patent Document 1. However, the projector described in Patent Document 2 suffers from the problems described below.

High-luminance components in the form of green lasers or green LEDs are not yet being mass-produced and, currently, low-luminance components are being used. As a result, LEDs in the projector described in Patent Document 2 achieve high luminance by being arranged in an array.

However, a projection-type display device in which light from the light source is irradiated upon a display element and the image formed in the display element is projected by projection lens is subject to the constraint known as "etendue" that is determined by the area of the light source and the angle of divergence. If the value of the product of the area of the light source and the angle of divergence is not made equal to or less than the value of the product of the area of the display element and the acceptance angle (solid angle) that is determined by the f-number of the projection lens, the light from the light source cannot be used as projection light. Accordingly, even if a multiplicity of LEDs is aligned in an array, brightness cannot be improved beyond the limits of etendue.

In the illumination optics described in Patent Document 2, since the area of the LED semiconductor chip or the number of LEDs is limited due to the above-described limits of etendue, it is difficult to obtain output light whose amount is enough. Thus realizing higher luminance in the illumination optics described in Patent Document 2 is difficult.

Further, in the projector of Patent Document 2, an LED array of each color is arranged to face a different surface of a cross dichroic prism. When providing cooling means for the LED arrays of each color that are arranged in this way, the following two methods can normally be used.

In the first method, cooling means is provided for each LED array. However, in this case, a plurality of cooling means must be provided and this causes an increase in the size of the projector.

In the second method, the air current from a single cooling means is supplied to the LED array of each color by way of air ducts. However, a cooling system that uses such air ducts becomes a large-scale component and therefore causes an increase in the size of the projector.

In the illumination optics described in Patent Document 2 as described hereinabove, limiting an increase in the size of the cooling means is problematic.

It is an object of the present invention to provide a lighting device that is both compact and high-luminance in which the cooling means is not large and a projection-type display device that is equipped with the lighting device.

To achieve the above-described object, the lighting device of the present invention includes:

an excitation light source unit that supplies excitation light;

a phosphor unit that emits fluorescent light by the excitation caused by excitation light supplied from the excitation light source unit;

first and second solid-state light sources for which the color of emitted light differs; and first to third reflection units each equipped with a dichroic film, the film surfaces of the dichroic films crossing the center ray of luminous flux of fluorescent light emitted from the phosphor unit, and moreover, being orthogonal to the plane that contains the center ray;

the excitation light source unit and the first and second solid-state light sources being arranged on one side of the center ray of the fluorescent luminous flux when viewed from a direction perpendicular to the plane;

the dichroic film of the first reflection unit being provided at the position at which the luminous flux of the excitation light supplied from the excitation light source unit crosses the luminous flux of the fluorescent light emitted from the phosphor unit and both reflecting the excitation light from the excitation light source unit toward the phosphor unit and transmitting the fluorescent light from the phosphor unit;

the dichroic film of the second reflection unit being provided at the position at which the luminous flux of first light supplied from the first light source unit crosses the luminous flux of the fluorescent light from the first reflection unit and both reflecting the first light from the first light source unit toward the third reflection unit and transmitting the fluorescent light from the first reflection unit; and the dichroic film of the third reflection unit being provided at the position at which the luminous flux of second light supplied from the second light source unit crosses the luminous flux of the fluorescent light and the luminous flux of the first light from the second reflection unit and both transmitting the fluorescent light and the first light from the second reflection unit and reflecting the second light from the second light source unit in a traveling direction of the transmitted light.

The projection-type display device of the present invention includes:

the above-described lighting device;

a cooling fan that supplies an air current to the excitation light source unit and first and second solid-state light sources that make up the lighting device;

a display element that spatially modulates light emitted from the lighting device; and projection optics that project the image light formed in the display element.

EXPLANATION OF REFERENCE NUMBERS

Figure 1:
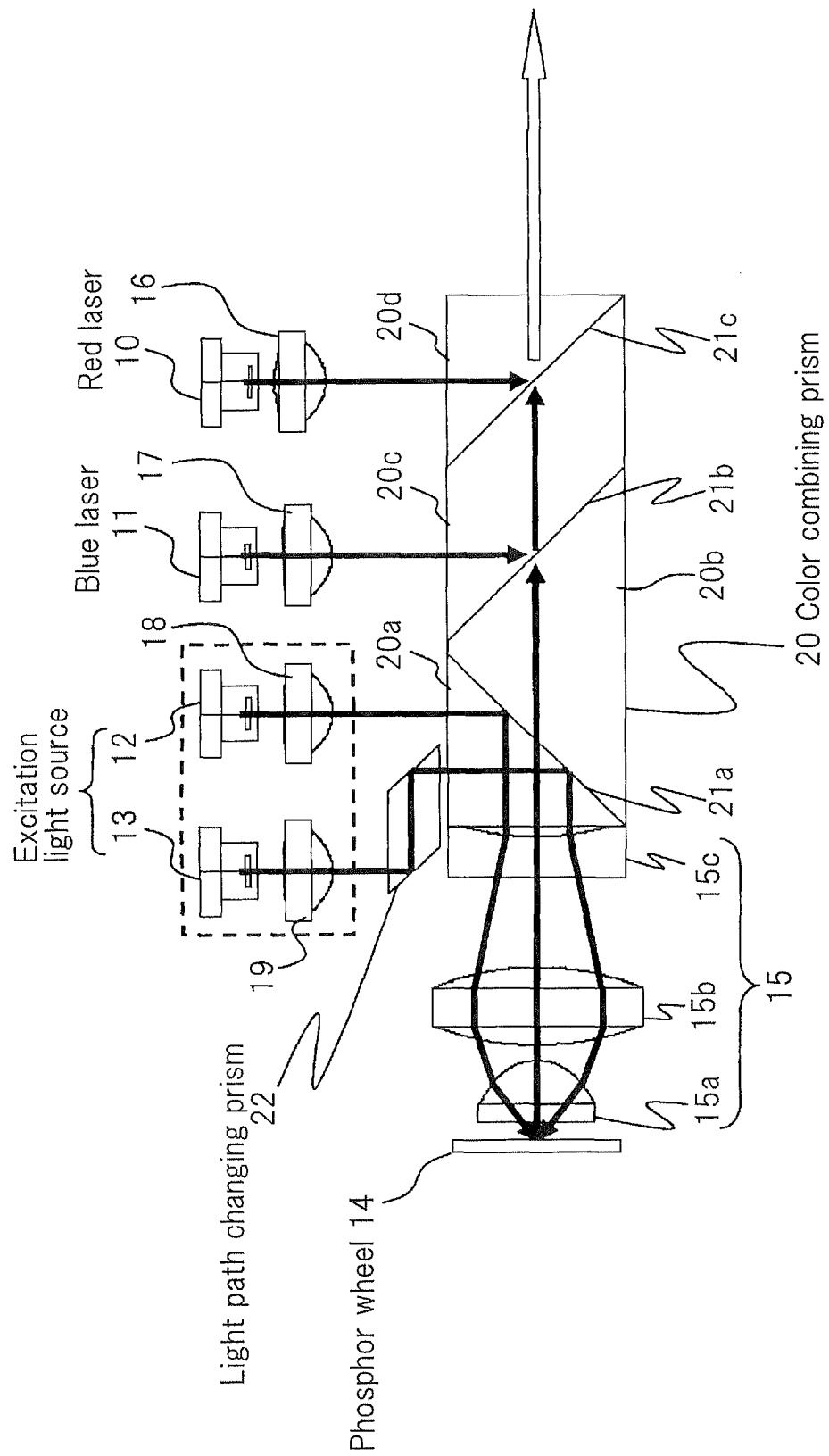
FIG. 1 is a schematic view showing the configuration of the lighting device that is the first exemplary embodiment of the present invention.

10 red laser
11 blue laser
12, 13 excitation light source
14 phosphor wheel
15-19 collimator lens
20 color-combining prism
22 light path changing prism

BEST MODE FOR CARRYING OUT THE INVENTION

Exemplary embodiments of the present invention are next described with reference to the accompanying drawings.

First Exemplary Embodiment

FIG. 1 is a schematic view showing the configuration of the lighting device that is the first exemplary embodiment of the present invention.

Referring to FIG. 1, the lighting device is a device that is used in a projection-type display device such as a projector and includes: red laser 10, blue laser 11, excitation light sources 12 and 13, phosphor wheel 14, collimator lenses 15-19, color-combining prism 20, and light path changing prism 22.

In FIG. 1, the light path of red laser light that is supplied from red laser 10, the light path of blue laser light that is supplied from blue laser 11, the light paths of excitation light that is supplied from excitation light sources 12 and 13, and the light path of green fluorescent light that is emitted from phosphor wheel 14 are shown by solid lines (heavy lines) with arrows. The white arrow is light in which the red laser light, blue laser light, and green fluorescent light are combined and is the output light of the lighting device of the present exemplary embodiment. All of the light paths of each color are indicated only by the light paths of the center rays and are actually luminous flux composed of a plurality of rays.

Red laser 10 and blue laser 11 are solid-state light sources such as semiconductor lasers or LEDs of which laser diodes are representative. Red laser 10 supplies S-polarized laser light having a peak wavelength in the red wavelength band (hereinbelow indicated as red laser light). Blue laser 11 supplies S-polarized laser light having a peak wavelength in the blue wavelength band (hereinbelow indicated as blue laser light).

Phosphor wheel 14 is composed of a wheel on which a phosphor region is formed along the outer periphery of one surface. The center portion of phosphor wheel 14 is supported by a rotation axis that is linked to an output axis of a motor not shown in the figure (or the output axis), phosphor wheel 14 receiving the rotational drive realized by the motor and rotating at a fixed speed. The emitted color of the phosphor that is formed in the phosphor region is green, and due to the excitation of the phosphor by the excitation light of a wavelength shorter than that of this green wavelength, green phosphor light is emitted from the phosphor region.

Excitation light sources 12 and 13 are light sources that supply S-polarized excitation light of a wavelength that is shorter than the wavelength of green fluorescent light, and are made up of solid-state light sources of which, for example, blue lasers or blue LEDs are representative. The peak wavelength of output light of excitation light sources 12 and 13 may be the same as or may differ from blue laser 11.

Collimator lens 15 is a component that converts the green fluorescent light (diverging light) that is emitted from the phosphor region of phosphor wheel 14 to parallel luminous flux and is made up of two convex lenses 15a and 15c and one concave lens 15c. Collimator lens 15 is not limited to the lens configuration shown in FIG. 1, and may be of any lens configuration that enables conversion of the green fluorescent light emitted from the phosphor region to parallel luminous flux.

Collimator lens 16 converts the red laser light (diverging light) supplied from red laser 10 to parallel luminous flux. Collimator lens 17 converts the blue laser light (diverging light) that is supplied from blue laser 11 to parallel luminous flux. Collimator lens 18 converts the excitation light (diverging light) that is supplied from excitation light source 12 to parallel luminous flux. Collimator lens 19 converts the excitation light (diverging light) that is supplied from excitation light source 13 to parallel luminous flux.

When viewed from a direction perpendicular to the plane that contains the center ray of green fluorescent light from phosphor wheel 14, red laser 10, blue laser 11, and excitation light sources 12 and 13 are positioned on one side of the center ray.

Red laser 10, blue laser 11, and excitation light sources 12 and 13 are arranged so as to emit light in the same direction. More specifically, the optical axes of each of red laser 10, blue laser 11 and excitation light sources 12 and 13 are mutually parallel. The output light of each of red laser 10, blue laser 11, and excitation light sources 12 and 13 is incident to color-combining prism 20 from the same side.

Color-combining prism 20 is a dichroic prism shaped as a rectangular parallelepiped and composed of four prisms 20a-20d.

Figure 2:
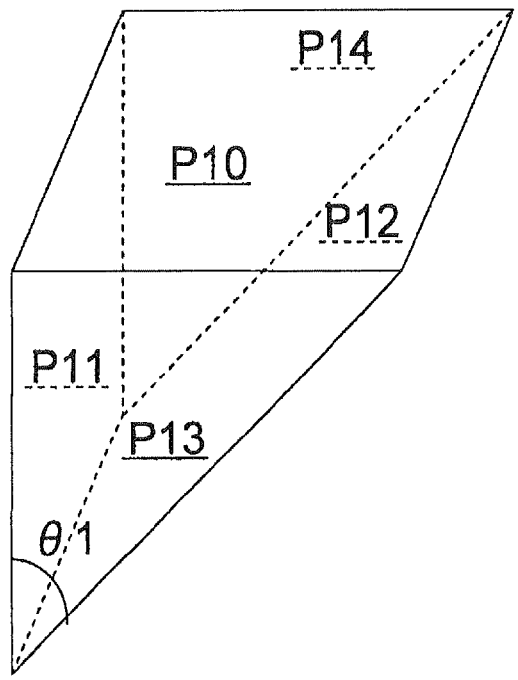
FIG. 2 is a schematic view showing a prism that makes up the color-combining prism of the lighting device shown in FIG. 1.

Prisms 20a and 20d are rectangular prisms, their shape and size being substantially equal. FIG. 2 gives a schematic representation of a rectangular prism that is used as these prisms 20a and 20d.

As shown in FIG. 2, the rectangular prism is a right isosceles triangular prism and has five surfaces P10-P14. In FIG. 2, reference numbers P10-P14 are underlined, the reference numbers that are underlined by solid lines indicating visible surfaces and the reference numbers that are underlined by broken lines indicating hidden surfaces.

Surfaces P10 and P11 are rectangular surfaces that are mutually orthogonal (corresponding to surfaces that make up the two orthogonal sides of a right triangle when viewed from the side). Surface P12 is an inclined surface (corresponding to the surface that makes up the hypotenuse of a right triangle when viewed from the side). Surface P13 and surface P14 are side surfaces that are orthogonal to each of surfaces P10-P12. The angle formed by surface P11 and surface P12 is θ1.

Figure 3:
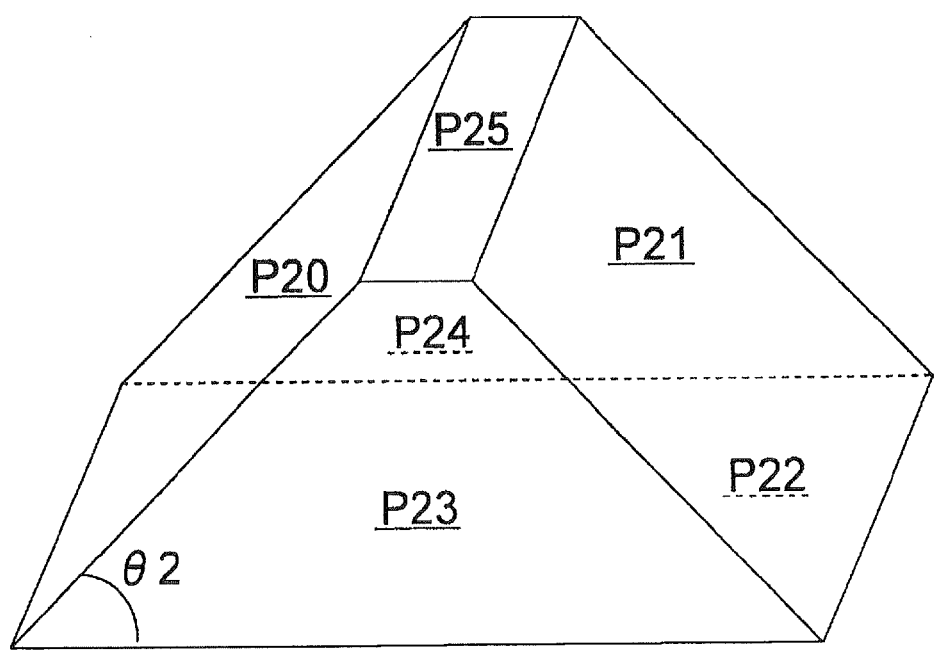
FIG. 3 is a schematic view showing another prism that makes up the color-combining prism of the lighting device shown in FIG. 1.

Prism 20b is a trapezoid-shaped prism (square pole). FIG. 3 gives a schematic representation of a trapezoid-shaped prism that is used as prism 20b.

The trapezoidal prism shown in FIG. 3 is a shape obtained by cutting away the apex (the point that forms a right angle) of a right isosceles triangular prism and has six surfaces P20-P25. In FIG. 3, reference numbers P20-P25 are underlined, the reference numbers underlined by solid lines indicating visible surfaces and the reference numbers underlined by broken lines indicating hidden surfaces.

Surfaces P20 and P21 are the opposing inclined surfaces of a trapezoid, and the plane that contains surface P20 is orthogonal to the plane that contains surface P21. Surface P25 is the surface that constitutes the upper surface of the trapezoid, and surface P22 is the surface that forms the bottom surface of the trapezoid. Surface P25 and surface P22 are parallel. Surface P23 and surface P24 are side surfaces that are orthogonal to each of surfaces P20-P22. Angle θ2 formed by surface P20 and surface P22 is identical to the angle formed by surface P21 and surface P22. Angle θ2 is identical to angle θ1 formed by surface P11 and surface P12 shown in FIG. 2.

The shape and size of surface P20 of prism 20b are substantially identical to the shape and size of surface P12 (inclined surface) of prism 20a. As shown in FIG. 1, surface P12 of prism 20a and surface P20 of prism 20b are bonded together, and dichroic surface (film) 21a is formed on this bonded surface.

Figure 4:
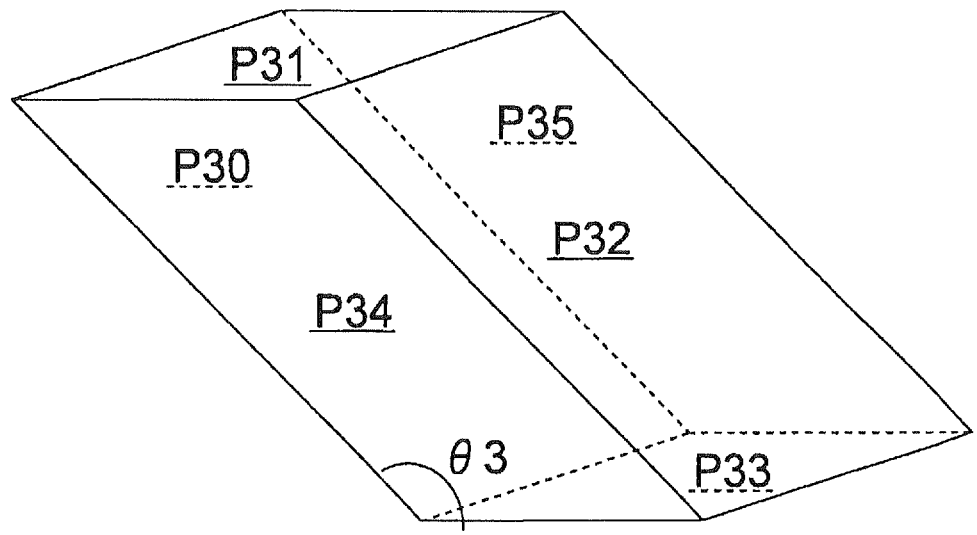
FIG. 4 is a schematic view showing another prism that makes up the color-combining prism of the lighting device shown in FIG. 1.

Prism 20c is parallelogram-shaped prism (oblique prism). FIG. 4 gives a schematic representation of a parallelogram-shaped prism that is used as prism 20c.

As shown in FIG. 4, the parallelogram-shaped prism has six surfaces P30-P35. In FIG. 4, reference numbers P30-P35 are underlined, the reference numbers underlined by solid lines indicating visible surfaces and the reference numbers underlined by broken lines indicating hidden surfaces.

Surfaces P30-P33 are rectangular surfaces, surface P30 and surface P32 are arranged facing each other, and surface P31 and surface P33 are arranged facing each other. The shape and size of surface P30 are substantially equal to the shape and size of surface P21 of prism 20b. The shape and size of surface P32 are substantially equal to the shape and size of surface P12 (inclined surface) of prism 20d.

Surface P34 and surface P35 are side surfaces that are orthogonal to each of surfaces P30-P33 and are shaped as parallelograms. The angle formed by surface P30 and surface P33 is θ3 (=180°−θ2).

As shown in FIG. 1, surface P30 of prism 20c and surface P21 of prism 20b are bonded together, and dichroic surface (film) 21b is formed on this bonded surface. Surface P32 of prism 20c and surface P12 (inclined surface) of prism 20d are bonded together, and dichroic surface (film) 21c is formed on the bonded surface.

Figure 12:
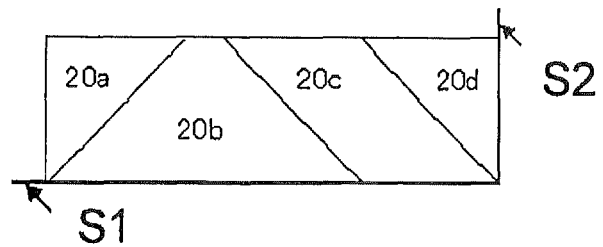
FIG. 12 is a schematic view showing the bonded state of each prism of the color-combining prism of the lighting device shown in FIG. 1.

When color-combining prism 20 is formed by prisms 20a-20d, for example, orthogonal reference surfaces S1 and S2 are set and prisms 20a-20d are bonded with these reference surfaces S1 and S2 as a reference to form color-combining prism 20 as shown in FIG. 12. Surface P22 of prism 20b and surface P33 of prism 20c are matched to reference surface S1 and surface P11 of prism 20d is matched to reference surface S2. Prisms 20b-20d are bonded in this state. When bonding prism 20d to prism 20c as well, the angled portion of prism 20d (the angle formed by surface P11 and surface P12) is matched to reference surface S1. Prism 20a is further bonded to prism 20b. When bonding prism 20a to prism 20b as well, the angled portion of prism 20a (the angle formed by surface P11 and surface P12) is matched to reference surface S1.

By means of the above-described bonding method, prism 20b between prisms 20a and 20c is made a trapezoid shape, whereby interference between the angled portion of prism 20a (the angle formed by surface P10 and surface P12) and the angled portion of prism 20c (the angle formed by surface P30 and surface P31) can be prevented even when prisms 20a and 20c are larger than the designed values.

Alternatively, prism 20b may be constituted by a triangular prism. More specifically, prism 20b is formed by a prism (triangular prism) that lacks the truncated portion that forms surface P25 in FIG. 3. In this case, however, upon applying the bonding method that is based on reference surfaces S1 and S2 shown in FIG. 12, prisms 20a and 20c will in some cases interfere when prisms 20a and 20c are larger than the designed values. Prisms 20a-20c must be shaped and bonded at high accuracy to prevent the occurrence of this interference.

In contrast, if trapezoid-shaped prism 20b shown in FIG. 3 is used, spacing corresponding to the width of surface P25 occurs between prisms 20a and 20c, and because the interference between prisms 20a and 20c can be limited to this extent, a certain amount of margin can be afforded in the accuracy demanded when shaping and bonding prisms 20a-20c.

All of dichroic surfaces 21a-21c are made up of dielectric multilayer films. Dichroic surfaces 21a-21c are arranged in that order along the luminous flux of green fluorescent light that is emitted from phosphor wheel 14 and converted to parallel luminous flux by collimator lens 15.

Figure 5:
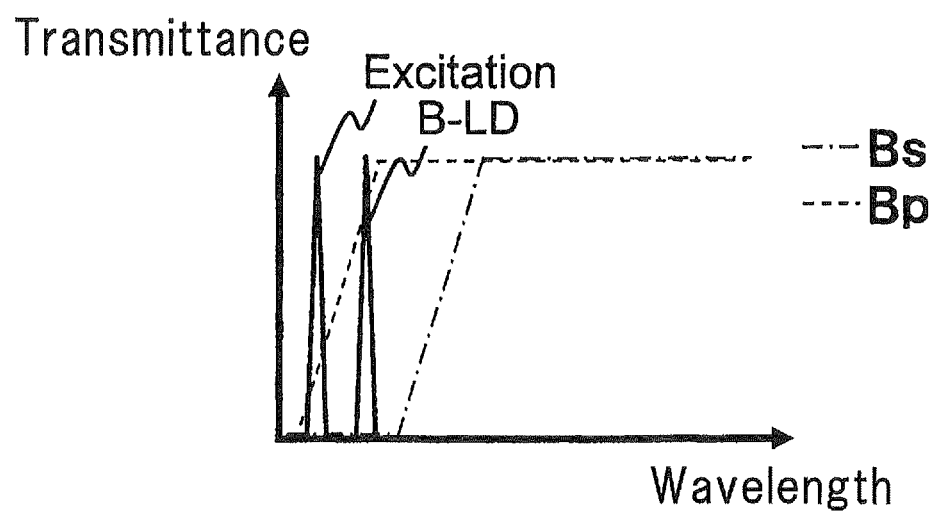
FIG. 5 is a graph showing the spectral transmission characteristics with respect to P-polarized light and S-polarized light of a dichroic surface (film) of the lighting device shown in FIG. 1.

Dichroic surfaces 21a and 21b have the same film characteristics. FIG. 5 shows the spectral transmission characteristics with respect to P-polarized light and S-polarized light of these dichroic surfaces 21a and 21b. In FIG. 5, the alternate long and short dash line shows the spectral transmission characteristic with respect to S-polarized light, and the broken line shows the spectral transmission characteristic with respect to P-polarized light. B-LD is the spectrum of blue laser light that is supplied from blue laser 11, and the spectrum that is on the lower wavelength side of this spectrum (Excitation) is the spectrum of excitation light that is supplied from excitation light sources 12 and 13. The spectrum of blue laser light may be the same wavelength band as the spectrum of excitation light.

The cutoff wavelength is defined as the wavelength at which transmittance becomes 50%. The cutoff wavelength of dichroic surfaces 21 and 21b with respect to light that is incident as S-polarized light is set such that light of wavelengths equal to or shorter than the blue wavelength band is reflected and light of other wavelength bands (including the green and red wavelength bands) is transmitted. The cutoff wavelength of dichroic surfaces 21a and 21b with respect to light incident as P-polarized light is set to the shorter wavelength side than the cutoff wavelength with respect to S-polarized light. The setting of the cutoff wavelength can be adjusted by the material, the number of layers, the film thickness, and the refractive index of the dielectric multilayer films.

In dichroic surfaces 21a and 21b that have the spectral transmission characteristics shown in FIG. 5, S-polarized light having a wavelength equal to or shorter than the blue wavelength band is reflected and light of the green and red wavelength bands is transmitted.

Figure 6:
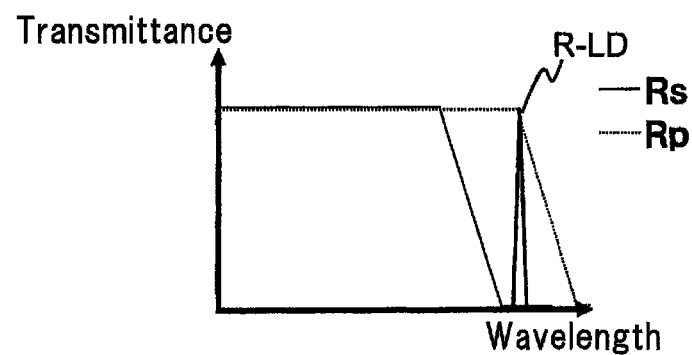
FIG. 6 is a graph showing the spectral transmission characteristics with respect to P-polarized light and S-polarized light of another dichroic surface (film) of the lighting device shown in FIG. 1.

FIG. 6 shows the spectral transmission characteristics with respect to P-polarized light and S-polarized light of dichroic surface 21c. In FIG. 6, the solid lines show the spectral transmission characteristic with respect to S-polarized light and the dotted lines show the spectral transmission characteristic with respect to P-polarized light. R-LD is the spectrum of red laser light supplied from red laser 10.

The cutoff wavelength of dichroic surface 21c with respect to light that is incident as S-polarized light is set to reflect light of wavelengths equal to or greater than the red wavelength band and to transmit light of other wavelength bands (including the green and blue wavelength bands). The cutoff wavelength of dichroic surface 21c with respect to light incident as P-polarized light is set to the side of longer wavelengths than the cutoff wavelength with respect to S-polarized light. In this case as well, the setting of the cutoff wavelength can be adjusted by the material, the number of layers, the film thickness, and the refractive index of the dielectric multilayer films.

In dichroic surface 21c that has the spectral transmission characteristic shown in FIG. 6, S-polarized light having wavelengths equal to or longer than the red wavelength band is reflected and S-polarized light of the green and blue wavelength bands is transmitted.

In the lighting device of the present exemplary embodiment, excitation light that is supplied from excitation light source 12 and converted to parallel luminous flux by collimator lens 18 is incident to surface P10 of prism 20a of color-combining prism 20. Excitation light that is supplied from excitation light source 13 and converted to parallel luminous flux by collimator lens 19 is incident to surface P10 of prism 20a of color-combining prism 20 by way of light path changing prism 22. Light path changing prism 22 is a parallelogram-shaped prism and is used for changing the light path of excitation light from excitation light source 13.

Blue laser light that is supplied from blue laser 11 and converted to parallel luminous flux by collimator lens 17 is incident to surface P31 of prism 20c of color-combining prism 20. Red laser light that is supplied from red laser 10 and converted to parallel luminous flux by collimator lens 16 is incident to surface P10 of prism 20d of color-combining prism 20.

In color-combining prism 20, each excitation light that is incident to surface P10 of prism 20a is incident at an angle of incidence of approximately 45° to dichroic surface 21a. Dichroic surface 21a reflects the excitation light that is incident in the direction of surface P11 of prism 20a.

Excitation light that is reflected by dichroic surface 21a exits from surface P11 of prism 20a. The excitation light that exits from surface P11 of prism 20a is condensed in the phosphor region of phosphor wheel 14 by way of collimator lens 15.

As shown in FIG. 1, when viewed from a direction perpendicular to the plane that contains the optical axis of collimator lens 15 (or the center ray of green fluorescent light from phosphor wheel 14), and moreover, that is orthogonal to dichroic surface 21a, the center ray of excitation light from excitation light source 12 that was reflected by dichroic surface 21a and the center ray of excitation light from excitation light source 13 that was reflected by dichroic surface 21a are in a substantially linear symmetrical positional relationship around the optical axis of collimator lens 15. As a result, the center ray of excitation light from excitation light source 12 and the center ray of excitation light from excitation light source 13 are condensed and the excitation light is irradiated at substantially the same position on the phosphor region by collimator lens 15.

In the phosphor region of phosphor wheel 14, the phosphor is excited by the irradiation of the excitation light. Green fluorescent light is emitted from the excited phosphor.

The green fluorescent light (diverging light) that is emitted from the phosphor region of phosphor wheel 14 is converted to parallel luminous flux by collimator lens 15 and is then incident to surface P11 of prism 20a of color-combining prism 20.

Figure 7:
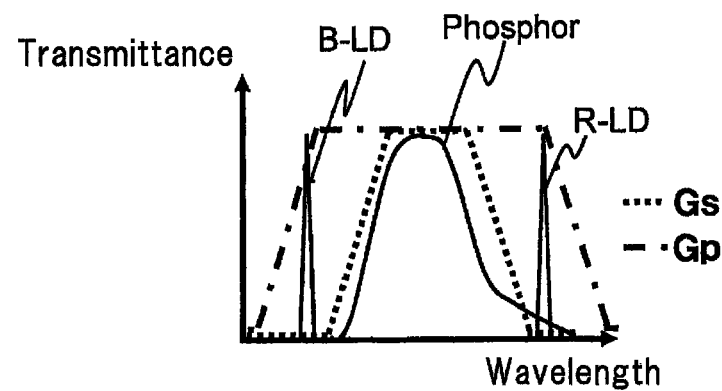
FIG. 7 is a graph showing the spectral transmission characteristics of the dichroic surface shown in FIG. 6 superposed on the spectral transmission characteristics of the dichroic surface shown in FIG. 5.

FIG. 7 shows the superposition of the spectral transmission characteristics of each of dichroic surfaces 21a-21c. In FIG. 7, the dotted lines show the spectral transmission characteristic with respect to S-polarized light, and the alternating long and short dash line shows the spectral transmission characteristic with respect to P-polarized light. The curved line shown by a solid line in the center of FIG. 7 is the spectrum of green fluorescent light from phosphor wheel 14.

The green fluorescent light from phosphor wheel 14 is random polarized light (containing S-polarized light and P-polarized light) and virtually all of this light is transmitted by dichroic surfaces 21a-21c.

In color-combining prism 20, green fluorescent light that is incident from surface P11 of prism 20a is incident to dichroic surface 21a at an angle of incidence of approximately 45°. Dichroic surface 21a transmits the incident green fluorescent light.

The transmitted luminous flux of the green fluorescent light from dichroic surface 21a is incident to dichroic surface 21b from the side of prism 20b at an angle of incidence of approximately 45°. Blue laser light from blue laser 11 is incident to dichroic surface 21b from the side of prism 20c at an angle of incidence of approximately 45°.

Dichroic surface 21b is disposed at the intersection of the optical axis of blue laser 11 and the center ray of the luminous flux of the green fluorescent light from phosphor wheel 14 (more specifically, the optical axis of the system that includes phosphor wheel 14 and collimator lens 15).

Dichroic surface 21b reflects blue laser light from blue laser 11 toward dichroic surface 21c and transmits the transmitted luminous flux of green fluorescent light from dichroic surface 21a. In this way, the blue laser light from blue laser 11 and the green fluorescent light from dichroic surface 21a are color-combined.

Luminous flux from dichroic surface 21b (blue laser light+green fluorescent light) is incident to dichroic surface 21c from the side of prism 20c. The red laser light from red laser 10 is incident to dichroic surface 21c at an angle of incidence of approximately 45° from the side of prism 20d.

Dichroic surface 21c is disposed at the intersection of the optical axis of red laser 10 and the center ray of the luminous flux of green fluorescent light from phosphor wheel 14 (more specifically, the optical axis of the system that includes phosphor wheel 14 and collimator lens 15).

Dichroic surface 21c reflects red laser light from red laser 10 toward surface P11 of prism 20d and transmits luminous flux from dichroic surface 21b (blue laser light+green fluorescent light). In this way, the red laser light from red laser 10 and luminous flux from dichroic surface 21b (blue laser light+green fluorescent light) are color-combined.

The luminous flux from dichroic surface 21c (blue laser light+green fluorescent light+red laser light) exits from surface P11 of prism 20d. This light that exits from surface P11 of prism 20d (red, green, and blue) is the output light of the lighting device of the present exemplary embodiment.

The lighting device of the present exemplary embodiment as described hereinabove exhibits the following action and effect.

The light-emitting device described in Patent Document 1 suffers from the problem of the large size of the light-emitting devices due to the use of light sources (light-emitting devices) that uses phosphor material as the red, green and blue light sources. In contrast, in the lighting device of the present exemplary embodiment, red and blue light sources are made of solid-state light sources, and the green light source is made of a light source that uses phosphor material. By adopting hybrid light sources in which solid-state light sources and a light source that uses a phosphor material are mixed, a lighting device can be realized that features both compact size and high luminance.

In the lighting device of the present exemplary embodiment, dichroic surfaces 21a-21c are disposed to intersect with the center ray of the luminous flux of green fluorescent light from phosphor wheel 14 (more specifically, the optical axis of the system that includes phosphor wheel 14 and collimator lens 15), and moreover, are disposed to be orthogonal to the plane that includes the center ray. Dichroic surfaces 21a-21c are then arranged in this order from the side of phosphor wheel 14 and in that order and the film characteristics of each of dichroic surfaces 21a-21c are assumed to have the characteristics shown in FIG. 5 to FIG. 7. In this way, each source of heat, i.e., red laser 10, blue laser 11, and excitation light sources 12 and 13 can be disposed in a row on the same side of color-combining prism 20.

By means of the above-described configuration, each source of heat can be simultaneously cooled by one cooling fan. In addition, a duct for guiding the cooling air current from the cooling fan to the sources of heat is not required. As a result, the cooling system can be realized by a simple configuration compared to the configuration described in Patent Document 2.

In addition, the lighting device of the present exemplary embodiment can obtain the following effects.

Typically, the luminance of fluorescent light emitted from a phosphor increases with increase in the intensity of the excitation light irradiated on the phosphor material.

In addition, the fluorescent size within a phosphor region is determined depending on the condensed size of the excitation light that is irradiated on the phosphor material. As a result, condensing and irradiating the excitation light by means of collimator lens 15 enables a reduction of the fluorescent size, whereby the problem of the reduction of the amount of light due to the limits of etendue can be eliminated.

In addition, the lighting device of the present exemplary embodiment enables the formation of red laser 10, blue laser 11, and excitation light sources 12 and 13 on the same substrate surface, thereby facilitating the alignment of the optical axes of each light source and enabling assembly of the lighting device with high precision.

In the above-described case, the light sources of red laser 10, blue laser 11, and excitation light sources 12 and 13 each may be disposed in one row, whereby each light source can be efficiently cooled by a single cooling fan.

Still further, in the above-described case, a heat sink, which is a heat-discharging means that discharges the heat energy from each of the light sources of red laser 10, blue laser 11, and excitation light sources 12 and 13 into space, may be provided on a portion of the substrate that is provided with red laser 10, blue laser 11, and excitation light sources 12 and 13. In this way, the effect of cooling each of the light sources of red laser 10, blue laser 11, and excitation light sources 12 and 13 can be augmented.

Figure 8:
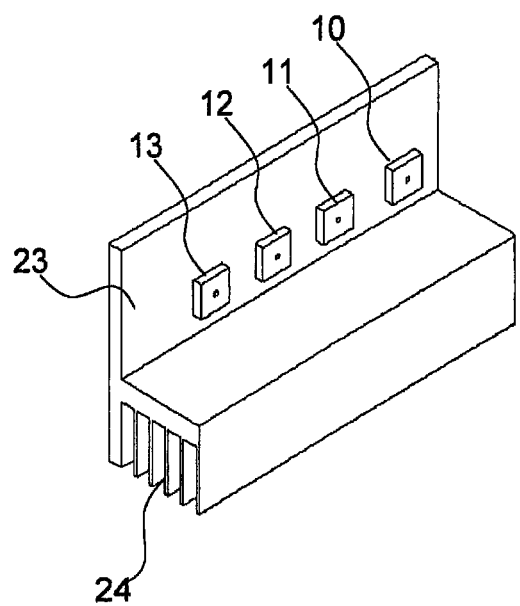
FIG. 8 is a schematic view showing an example of a unit in which each light source of the lighting device shown in FIG. 1 is provided on the same substrate surface.

FIG. 8 shows an example of a configuration in which each of the light sources of red laser 10, blue laser 11, and excitation light sources 12 and 13 is provided on the same substrate surface.

Referring to FIG. 8, red laser 10, blue laser 11, and excitation light sources 12 and 13 are disposed in a row on the same substrate surface of substrate 23 that has an L-shaped profile. Heat sink 24 is provided on a portion of substrate 23.

According to the configuration shown in FIG. 8, each light source can be effectively cooled by causing an air current (cooling wind) to flow along the row of each of the light sources of red laser 10, blue laser 11, and excitation light sources 12 and 13. In addition, the cooling effect can be further increased by the action of the heat discharge realized by a heat sink.

Figure 9:
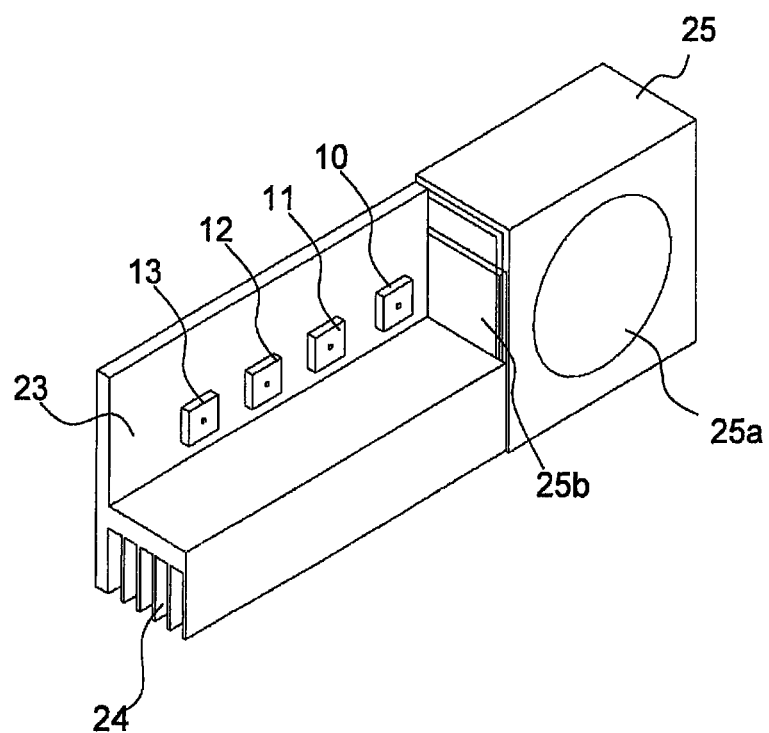
FIG. 9 is a schematic view showing a configuration in which a cooling fan is provided in the unit shown in FIG. 8.

FIG. 9 shows a configuration in which a cooling fan has been installed on the substrate shown in FIG. 8.

Referring to FIG. 9, cooling fan 25 is provided on one end of substrate 23 (the side on which red laser 10 is located). Cooling fan 25 is, for example, a sirocco fan and is equipped with inflow port 25a that takes in air and outflow port 25b that discharges air.

The air current that is discharged from outflow port 25b flows over the substrate surface on which each of light sources of red laser 10, blue laser 11, and excitation light sources 12 and 13 are provided and along the direction of the row of light sources. Each light source is thus cooled.

In addition, the air current discharged from outflow port 25b is also supplied to heat sink 24. Heat sink 24 has a plurality of fins, and a portion of the air current from outflow port 25b is supplied among these fins. Effective heat discharge can be provided by both the heat exchange between the fins and the air and the flow of air among the fins.

In addition, according to the lighting device of the present exemplary embodiment, the use of color-combining prism 20 in which dichroic surfaces 21a, 21c, and 21b are formed on the bonded surfaces of prisms enables the adjustment of the inclination of dichroic surfaces 21a, 21c, and 21b or the light path adjustment with respect to these dichroic surfaces (including adjustment of optical axes) to be carried out at one time. In this way, the assembly of the lighting device can be carried out simply and with high precision.

The lighting device of the above-described exemplary embodiment is one example of the present invention, and the configuration of the lighting device is open to various modifications that do not depart from the gist of the invention and that will be clear to one of ordinary skill in the art.

For example, the number of excitation light sources is not limited to two, and one excitation light source or three or more excitation light sources may be used.

In addition, light guide means or optics for guiding the light supplied from color-combining prism 20 may also be provided in the lighting device of the present exemplary embodiment.

Still further, in place of phosphor wheel 14, a phosphor section may also be used that includes a region in which a phosphor material is formed on the substrate surface.

In addition, the positions of dichroic surfaces 21b and 21c can be reversed. In other words, dichroic surfaces 21a, 21c, and 21b may be arranged in that order from the side of phosphor wheel 14. In this case, the positions of red laser 10 and blue laser 11 are also reversed.

Still further, a plurality of mirrors may be used in place of light path changing prism 22.

Second Exemplary Embodiment

Figure 10:
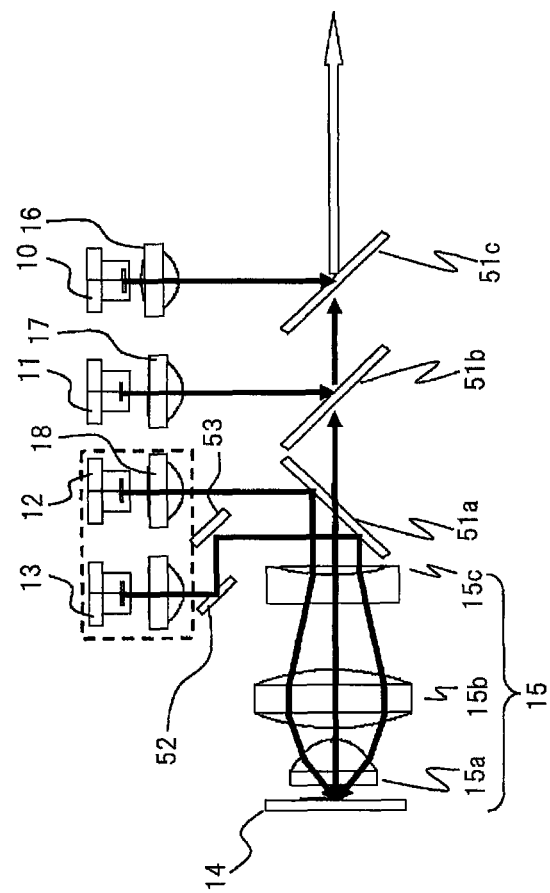
FIG. 10 is a schematic view showing the configuration of the lighting device that is the second exemplary embodiment of the present invention.

FIG. 10 is a schematic view showing the configuration of a lighting device that is the second exemplary embodiment of the present invention.

The lighting device of the present exemplary embodiment differs from the first exemplary embodiment in that it is equipped with dichroic mirrors 51a-51c in place of color-combining prism 20, and further, includes mirrors 52 and 53 in place of light path changing prism 22. The configuration is otherwise the same as the first exemplary embodiment (including modifications). In FIG. 10, the same reference numbers are given to constituent elements that are identical to those of the first exemplary embodiment.

Each of dichroic mirrors 51a-51c corresponds to dichroic surfaces 21a-21c, respectively, and all are composed of dielectric multilayer films.

Dichroic mirrors 51a-51c each cross the center ray of the luminous flux of green fluorescent light that is emitted from phosphor wheel 14, and moreover, are disposed orthogonal to the plane that contains the center ray. Dichroic mirrors 51a-51c are disposed successively and in that order from the side of phosphor wheel 14.

When viewed from a direction perpendicular to the above-described plane, red laser 10, blue laser 11, and excitation light sources 12 and 13 are arranged on one side of the center ray of the luminous flux of green fluorescent light.

The film characteristics of dichroic mirrors 51a and 51b are the same as those of dichroic surfaces 21a and 21b. In other words, dichroic mirrors 51a and 51b both have the characteristics shown in FIG. 5.

The film characteristics of dichroic mirror 51c are the same as those of dichroic surface 21c. In other words, dichroic mirror 51c has the characteristics shown in FIG. 6.

In the lighting device of the present exemplary embodiment, the excitation light that is supplied from excitation light source 12 and converted to parallel luminous flux by collimator lens 18 is incident to dichroic mirror 51a at an angle of incidence of approximately 45°. The excitation light that is supplied from excitation light source 13 and converted to parallel luminous flux by collimator lens 19 is incident to dichroic mirror 51a at an angle of incidence of approximately 45° by way of mirrors 52 and 53.

Dichroic mirror 51a reflects the incident excitation light in the direction of phosphor wheel 14. The excitation light that is reflected by dichroic mirror 51a is condensed on the phosphor region of phosphor wheel by way of collimator lens 15.

The center ray of the excitation light from excitation light source 12 and the center ray of the excitation light from excitation light source 13 are condensed on the phosphor region by collimator lens 15. As a result, the excitation light from excitation light source 12 and the excitation light from excitation light source 13 are condensed and irradiated upon substantially the same position on the phosphor region.

Phosphor is excited by the irradiation of the excitation light in the phosphor region of phosphor wheel 14. Green fluorescent light is emitted from the excited phosphor.

The green fluorescent light (diverging light) that is emitted from the phosphor region of phosphor wheel 14 is converted to parallel luminous flux by collimator lens 15 and then incident to dichroic mirror 51a. Dichroic mirror 51a transmits the incident green fluorescent light.

The transmitted luminous flux of the green fluorescent light from dichroic mirror 51a is incident to dichroic mirror 51b at an angle of incidence of approximately 45°. Dichroic mirror 51b is disposed at the intersection of the optical axis of blue laser 11 and the luminous flux of green fluorescent light from phosphor wheel 14 (more specifically, the optical axis of the system that includes phosphor wheel 14 and collimator lens 15). The blue laser light from blue laser 11 is incident to dichroic mirror 51b at an angle of incidence of approximately 45°.

Dichroic mirror 51b reflects the blue laser light from blue laser 11 toward dichroic mirror 51c, and transmits the transmitted luminous flux of green fluorescent light from dichroic mirror 51a, whereby the blue laser light from blue laser 11 and the green fluorescent light from dichroic mirror 51a are color-combined.

The luminous flux (blue laser light+green fluorescent light) from dichroic mirror 51b is incident to dichroic mirror 51c at an angle of incidence of approximately 45°. Dichroic mirror 51c is disposed at the intersection of the optical axis of red laser 10 and the luminous flux of the green fluorescent light from phosphor wheel 14 (more specifically, the optical axis of the system that includes phosphor wheel 14 and collimator lens 15). The red laser light from red laser 10 is incident to dichroic mirror 51c at an angle of incidence of approximately 45°.

Dichroic mirror 51c reflects the red laser light from red laser 10 and transmits the luminous flux from dichroic mirror 51b (blue laser light+green fluorescent light), whereby the red laser light from red laser 10 and the luminous flux (blue laser light+green fluorescent light) from dichroic mirror 51b are color-combined.

The luminous flux (blue laser light+green fluorescent light+red laser light) from dichroic mirror 51c is the output light of the lighting device of the present exemplary embodiment.

The lighting device of the present exemplary embodiment described hereinabove exhibits the same action and effect as the first exemplary embodiment. However, the lighting device of the present exemplary embodiment requires a holding construction that separately limits the inclination of the mirrors for dichroic mirrors 51a-51c. In some cases, the inclination of these mirrors and light paths must be adjusted. As a result, the lighting device of the first exemplary embodiment enables simpler and more precise adjustment of the inclination of mirrors or adjustment of light paths than the lighting device of the present exemplary embodiment.

The lighting device of the present exemplary embodiment also allows the application of the various modifications described in the first exemplary embodiment (including the configuration shown in FIGS. 8 and 9).

In addition, light path changing prism 22 shown in FIG. 1 may be used in place of mirrors 52 and 53.

Another Exemplary Embodiment

The lighting device of this other exemplary embodiment includes: an excitation light source unit that supplies excitation light; a phosphor unit that emits fluorescent light by the excitation resulting from excitation light that is supplied from the excitation light source unit; first and second solid-state light sources in which the color of emitted light differs; and first to third reflection units that are each equipped with dichroic film, whose surfaces intersect with the center ray of the luminous flux of fluorescent light emitted from the phosphor unit, and moreover, that are disposed so as to be orthogonal to the plane that contains the center ray.

The excitation light source unit and the first and second solid-state light sources, when viewed from a direction that is perpendicular to the above-described plane, are disposed on one side of the center ray of the fluorescent luminous flux.

The dichroic film of the first reflection unit is provided at the position at which the luminous flux of excitation light that is supplied from the excitation light source unit crosses the luminous flux of fluorescent light that is emitted from the phosphor unit, and both reflects excitation light from the excitation light source unit toward the phosphor unit and transmits fluorescent light from the phosphor unit.

The dichroic film of the second reflection unit is provided at the position at which luminous flux of the first light that is supplied from the first light source unit intersects with luminous flux of fluorescent light from the first reflection unit, and both reflects the first light from the first light source unit toward the third reflection unit and transmits the fluorescent light from the first reflection unit.

The dichroic film of the third reflection unit is provided at the position at which the luminous flux of the second light that is supplied from the second light source unit crosses the luminous flux of the fluorescent light and the luminous flux of the first light from the second reflection unit, and both transmits the fluorescent light and the first light from the second reflection unit and reflects the second light from the second light source unit in the traveling direction of the transmitted light.

The phosphor unit may be phosphor wheel 14 that is shown in FIG. 1. The first solid-state light source may be made up of red laser 10 and collimator lens 16 shown in FIG. 1 or FIG. 10. The second solid-state light source may be made up of blue laser 11 and collimator lens 17 shown in FIG. 1 or FIG. 10. Alternatively, the second solid-state light source may be made up of red laser 10 and collimator lens 16 and the first solid-state light source may be made up of blue laser 11 and collimator lens 17.

The excitation light source unit may be made up of excitation light sources 12 and 13 shown in FIG. 1 or FIG. 10. The first to third reflection units may be made up of color-combining prism 20 shown in FIG. 1, or may be made up of dichroic mirrors 51a-51c shown in FIG. 10.

When the first solid-state light source is blue laser 11 and the second solid-state light source is red laser 10, the cutoff wavelength with respect to the first polarized light (more specifically, S-polarized light) of the dichroic film of the first and second reflection units is set so as to reflect light of the blue wavelength band and transmit light of at least the green wavelength band, and the cutoff wavelength with respect to the first polarized light of the third dichroic surface is set so as to transmit light of each of the blue and green wavelength bands and reflect light of the red wavelength band.

In contrast, when the first solid-state light source is red laser 10 and the second solid-state light source is blue laser 11, the cutoff wavelength with respect to the first polarized light of the dichroic films of the first and third reflection units is set to reflect light of the blue wavelength band and transmit light of each of the red and green wavelength bands. The cutoff wavelength with respect to first polarized light of the second dichroic surface is set to transmit light of at least the green wavelength band and reflect light of the red wavelength band.

The various modifications described in the first exemplary embodiment can be applied to the lighting device of this other exemplary embodiment. The lighting device exhibits the same action and effect as the previously described lighting devices of the first and second exemplary embodiments.

The lighting device of the above-described present invention can be applied to all types of projection-type display devices of which projectors are representative.

A projection-type display device includes: the lighting device of the present invention, a display element that spatially modulates light that is supplied from this lighting device, and projection optics that project the image light that is formed by the display element. The display element is, for example, a DMD or a liquid crystal panel.

Figure 11:
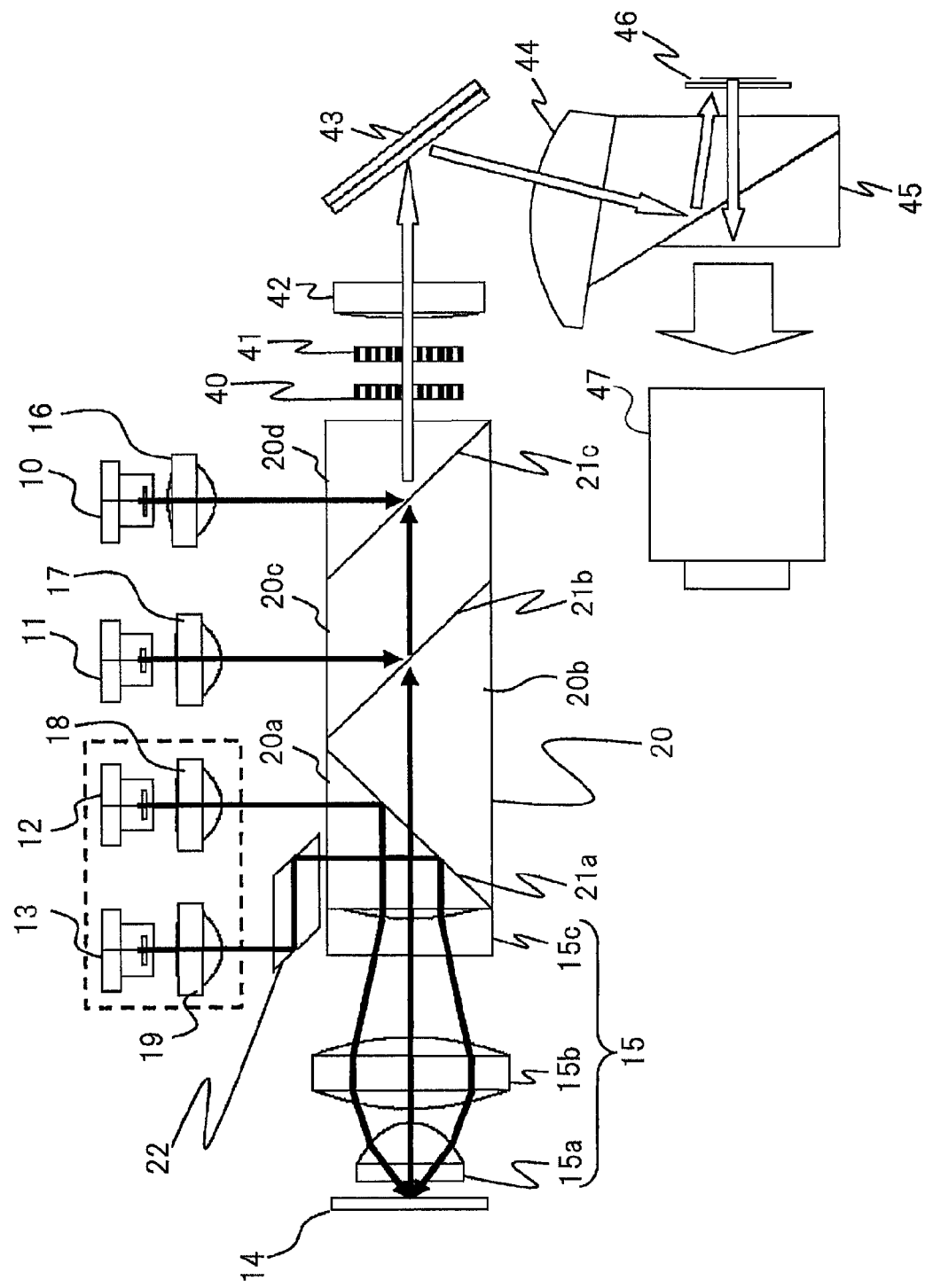
FIG. 11 is a schematic view showing an example of a projection-type display device that is equipped with the lighting device of the present invention.

FIG. 11 shows an example of a projection-type display device that is equipped with the lighting device of the present invention.

Referring to FIG. 11, the projection-type display device includes: DMD 46 that is a display element, a lighting device that is the first exemplary embodiment, optics for guiding the light from the lighting device to DMD 46, a cooling fan that cools the lighting device, and projection optics 47 that project the image light that is formed in DMD 46 onto a screen (not shown).

The optics include: fly-eye lenses 40 and 41, field lens 42, mirror 43, condenser lens 44, and total internal reflection (TIR) prism 45.

Fly-eye lenses 40 and 41, field lens 42, and mirror 43 are disposed in this order in the traveling direction of light (red, green, and blue) that exits from surface P11 of prism 20d of color-combining prism 20.

Condenser lens 44 and TIR prism 45 are disposed in this order in the traveling direction of light that is reflected by mirror 43.

Fly-eye lenses 40 and 41 are elements for obtaining illumination light that is rectangular illumination and uniform on the irradiated surface of DMD 46, are each composed of a plurality of micro lenses, and are disposed so as to have a mutual one-to-one correspondence.

Light that has passed through fly-eye lenses 40 and 41 is incident to TIR prism 45 by way of field lens 42, mirror 43, and condenser lens 44.

TIR prism 45 is made up of two triangular prisms, and light that is condensed by condenser lens 44 is incident into TIR prism 45 from the side surface of one triangular prism. In TIR prism 45, the incident light is totally reflected by the inclined surface of the triangular prism, and this reflected light exits toward DMD 46 from the other surface of the triangular prism. The surface at which the two triangular prisms are joined is also a total reflection surface, and an air layer is therefore necessary between the two surfaces. Accordingly, when joining the two triangular prisms, an air layer is maintained between the two triangular prisms by adhering interposed spacers to both triangular prisms.

DMD 46 spatially modulates light that is incident from TIR prism 45. The modulated light (image light) from DMD 46 is again irradiated into TIR prism 45 from the other surface of the triangular prism, and this irradiated image light is transmitted unaltered through the junction surface of the triangular prisms and exits from the side surface of the other triangular prism.

The image light that exits from the side surface of the other triangular prism of TIR prism 45 is enlarged and projected upon an outside screen by projection optics 47.

By controlling the lighting timing of excitation light sources 12 and 13, red laser 10, and blue laser 11, luminous flux of each of the colors red, green, and blue exits from color-combining prism 20 in time divisions. The luminous flux of each color that exits in these time divisions is subjected to spatial modulation using DMD whereby image light of each color can be obtained.

A cooling fan discharges an air current. Each of the light sources of excitation light sources 12 and 13, red laser 10, and blue laser 11 are provided in the traveling direction of the air current that is discharged from the cooling fan. The air current of the cooling fan is supplied to each light source to cool each light source. A construction such as shown in FIG. 9 can be applied as the cooling fan.

The lighting device of the previously described second exemplary embodiment or the other exemplary embodiment may be used in the above-described projection-type display device.

What is claimed is:
1. A lighting device comprising:
an excitation light source unit that supplies excitation light;
a phosphor unit that is excited by excitation light supplied from said excitation light source unit to emit fluorescence;
first and second solid-state light sources, a color of emitted light of each source being different from each other;
a color-combining prism that includes a first rectangular prism, a second rectangular prism, a trapezoid-shaped prism and a parallelogram-shaped prism; and
first to third reflection units, each unit including a dichroic film whose film surface is disposed to cross a center ray of a luminous flux of the fluorescence emitted from said phosphor unit, and moreover, to be orthogonal to a plane containing the center ray;
wherein:
said excitation light source unit and said first and second solid-state light sources are arranged on one side of the center ray of the luminous flux of the fluorescence when viewed from a direction perpendicular to the plane;
said first reflection unit comprises a surface in which said first rectangular prism and said trapezoid-shaped prism are bonded together;
said second reflection unit comprises a surface in which said trapezoid-shaped prism and said parallelogram-shaped prism are bonded together;

said third reflection unit comprises a surface in which said parallelogram-shaped prism and said second rectangular prism are bonded together, said dichroic film of said first reflection unit is provided at a position at which a luminous flux of the excitation light supplied from said excitation light source unit crosses the center ray of the luminous flux of the fluorescence emitted from said phosphor unit, reflects the excitation light from said excitation light source unit toward said phosphor unit, and transmits the fluorescence from said phosphor unit;

said dichroic film of said second reflection unit is provided at a position at which a luminous flux of a first light supplied from said first solid-state light source crosses the luminous flux of the fluorescence from said first reflection unit, reflects the first light from said first solid-state light source toward said third reflection unit, and transmits the fluorescence from said first reflection unit; and said dichroic film of said third reflection unit is provided at a position at which a luminous flux of a second light supplied from said second solid-state light source crosses both the luminous flux of the fluorescence and the luminous flux of the first light that are supplied from said second reflection unit, transmits the fluorescence and the first light from said second reflection unit, and reflects the second light from said second solid-state light source in a traveling direction of the transmitted light.

2. The lighting device as set forth in claim 1, wherein said excitation light source unit and said first and second solid-state light sources are provided on a same substrate surface.

3. The lighting device as set forth in claim 2, further comprising a heat-discharging unit that is provided on a part of said substrate, on which said excitation light source unit and said first and second solid-state light sources are provided, and that discharges heat energy from said excitation light source unit and from said first and second solid-state light sources into a space.

4. The lighting device as set forth in claim 1, wherein said excitation light source unit and said first and second solid-state light sources are arranged in a row in one direction.

5. The lighting device as set forth in claim 4, further comprising a heat-discharging unit that is provided on a part of a substrate, on which said excitation light source unit and said first and second solid-state light sources are provided, and that discharges heat energy from said excitation light source unit and from said first and second solid-state light sources into a space.

6. The lighting device as set forth in claim 1, wherein:
each of said first and second rectangular prisms includes right-angle surfaces and an inclined surface;
said dichroic film of said first reflection unit is formed on a bonded surface which is provided by bonding the inclined surface of said first rectangular prism to one of the opposite inclined surfaces of said trapezoid-shaped prism;
said dichroic film of said second reflection unit is formed on a bonded surface which is provided by bonding one of the opposite inclined surfaces of said parallelogram-shaped prism to the other opposite inclined surface of said trapezoid-shaped prism; and
said dichroic film of said third reflection unit is formed on a bonded surface which is provided by bonding the other opposite inclined surface of said parallelogram-shaped prism to said inclined surface of said second rectangular prism.

7. The lighting device as set forth in claim 1, further comprising a collimator lens that converts the fluorescence emitted from said phosphor unit to parallel luminous flux;
wherein said collimator lens condenses the excitation light that is supplied from said excitation light source unit and that is reflected by said dichroic film of said first reflection unit onto said phosphor unit.

8. The lighting device as set forth in claim 7, wherein said excitation light source unit includes first and second excitation light sources, and a center ray of excitation light that is supplied from said first excitation light source and that is reflected by said dichroic film of said first reflection unit and a center ray of excitation light that is supplied from said second excitation light source and that is reflected by said dichroic film of said first reflection unit are in a linear symmetrical positional relationship around the optical axis of said collimator lens.

9. The lighting device as set forth in claim 1, wherein:
said phosphor unit emits green fluorescence;
said first solid-state light source supplies blue laser light whose peak wavelength is in a blue wavelength band and whose polarization state is a first polarization;
said second solid-state light source supplies red laser light whose peak wavelength is in a red wavelength band and whose polarization state is said first polarization;
said excitation light source unit supplies excitation light whose peak wavelength is in said blue wavelength band and whose polarization state is said first polarization;
a cutoff wavelength with respect to said first polarization of said dichroic film of said first and second reflection units is set such that light of said blue wavelength band is reflected and light of at least a green wavelength band is transmitted; and
a cutoff wavelength with respect to said first polarization of said dichroic film of said third reflection unit is set such that light of each of said blue and green wavelength bands is transmitted and light of said red wavelength band is reflected.

10. The lighting device as set forth in claim 1, wherein:
said phosphor unit emits green fluorescence;
said first solid-state light source supplies red laser light whose peak wavelength is in a red wavelength band and whose polarization state is a first polarization;
said second solid-state light source supplies blue laser light whose peak wavelength is in a blue wavelength band and whose polarization state is said first polarization;
said excitation light source unit supplies excitation light whose peak wavelength is in said blue wavelength band and whose polarization state is said first polarization;
a cutoff wavelength with respect to said first polarization of said dichroic film of said first and third reflection units is set such that light of said blue wavelength band is reflected and light of a green wavelength band and said red wavelength band are transmitted; and
a cutoff wavelength with respect to said first polarization of said dichroic film of said second reflection unit is set such that light of at least said green wavelength band is transmitted and light of said red wavelength band is reflected.

11. A projection-type display device comprising:
the lighting device as set forth in claim 1;
a cooling fan that supplies an air current to the excitation light source unit and first and second solid-state light sources that make up said lighting device;
a display element that spatially modulates light emitted from said lighting device; and projection optics that project an image light formed in said display element.

12. The lighting device as set forth in claim 1, further comprising a space between the first rectangular prism and the second rectangular prism.

13. The lighting device as set forth in claim 1, further comprising a space between the first rectangular prism and the second rectangular prism formed via the trapezoid-shaped prism.

14. The lighting device as set forth in claim 1, further comprising a space between the first rectangular prism and the second rectangular prism, the trapezoid-shaped prism being disposed in said space.

15. The lighting device as set forth in claim 1, wherein said trapezoid-shaped prism is disposed such that no interference occurs between said first rectangular prism and said second rectangular prism.

16. The lighting device as set forth in claim 1, wherein said first rectangular prism does not interfere with said second rectangular prism.

17. The lighting device as set forth in claim 1, wherein said first rectangular prism does not contact said second rectangular prism.

* * * * *